July 18, 1967 W. G. WAIDELICH ET AL 3,331,235
METERING UNIT CALIBRATOR MECHANISM
Filed Jan. 21, 1965 2 Sheets-Sheet 1
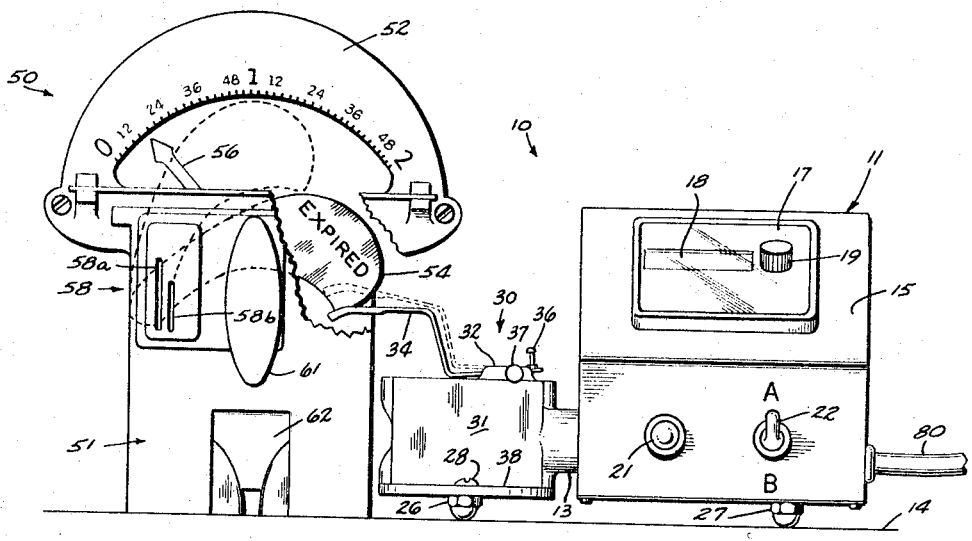
FIG. 1
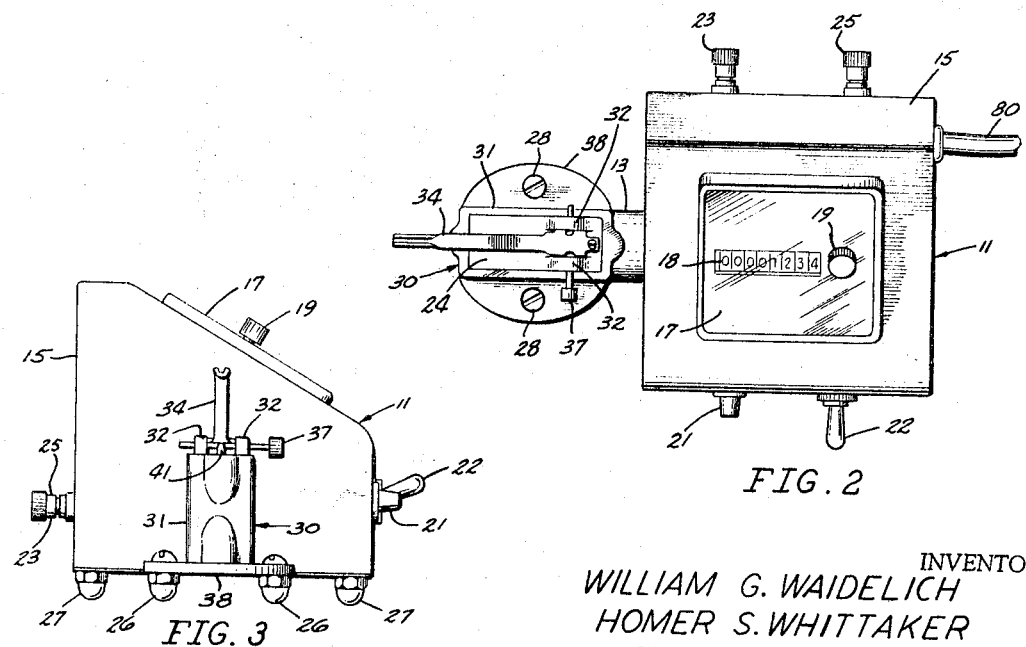
FIG. 2
FIG. 3
INVENTORS
WILLIAM G. WAIDELICH
HOMER S. WHITTAKER
GUY E. BACHMAN
BY Roy A. Plant
ATTORNEY

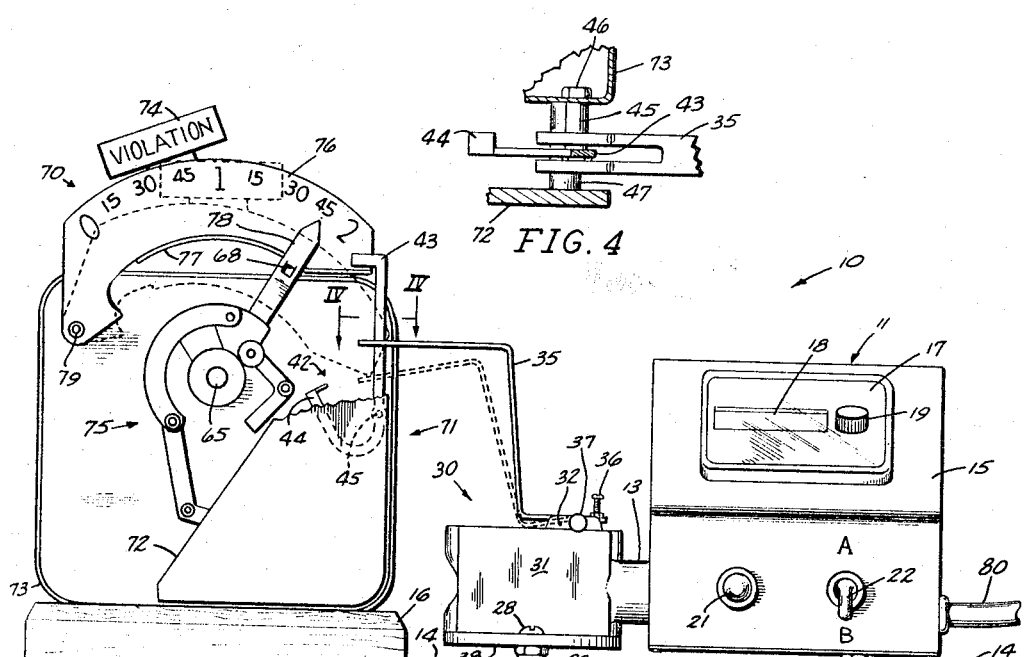

United States Patent Office 3,331,235
Patented July 18, 1967

3,331,235
METERING UNIT CALIBRATOR MECHANISM
William G. Waidelich, Homer S. Whittaker, and Guy E. Bachman, Marshall, Mich., assignors, by mesne assignments, to R. R. Reed & Company, Inc., East Lansing, Mich.
Filed Jan. 21, 1965, Ser. No. 426,955
11 Claims. (Cl. 73—6)

The present invention relates broadly to a mechanism for calibrating metering unit devices and more specifically to a calibrator mechanism especially adapted to calibrate metering units, such as coin operated meters, and to be actuated by the timer devices of the metering units.

Various metering units having timer devices, such as parking meters, binocular lens meters, amusement ride meters, et cetera, have come into common use throughout the United States and various foreign countries. The vast majority of these metering units are subjected to hard and rough handling by some users and other persons who come in contact with the units. The owners of such units have numerous environmental conditions and sundry maintenance schedules which manufacturers of metering units must attempt to build their equipment to withstand. The hard and rough handling many times affects the timer devices of the metering units so that accurate time periods are no longer metered by the units.

The owners are greatly concerned that the persons using their metering units receive the proper amount of time. They, also, are concerned that the metering units function in such a way that a user is not given excessive time. If this happens the flow of customers or users does not occur as scheduled which reduces the revenue producing ability of the equipment, space, service, et cetera, for which the metering units meter the time period.

In a normal type maintenance program established for the care of metering units by the owner, the units are usually picked up for cleaning, et cetera, in a normal rotational cycle or as they are reported malfunctioning by the users. At the time of our present invention there was no practical method available to check the time period of each metering unit as it arrived for repair. One method being used was to have a repairman time the period of a metering unit with a clock or watch to see if the timer device was in need of repair or adjustment. This method has proved to be quite costly and not sufficiently efficient or accurate. Frequently a metering unit would have to be checked more than once because the starting or stopping times were not noted properly; thus, the actual period was not known. It was a recognition of the above mentioned situation and facts with their difficulties and shortcomings that led tot he conception and development of our present invention.

Accordingly, among the objects of the present invention is to provide a mechanism for calibrating a metering unit's timer device without requiring the full attention of a repair or maintenance man.

Another object is to provide a mechanism for calibrating a metering unit's timer device which is able to automatically register the time period the metering cycle runs.

A further object is to provide a calibrator mechanism which has at least two positions in which the time period can be running and have automatic registration of the time period upon termination of the metering cycle.

A further object is to provide a calibrator mechanism which has an indicator which gives either or both an audible or visual signal when the metering period has terminated.

A further object is to provide a calibrator mechanism which automatically registers the time period and is controlled by the mechanical movement of the metering unit's parts.

A still further object of the present invention includes the provision of a calibrator mechanism capable of accomplishing the above objects with a minimum of material cost and fabricating expense, and at the same time being composed of a simple and ruggedly formed structure which is very reliable in application.

Still further objects and advantages of the invention will become apparent as the description proceeds.

To the accomplishment of the foregoing and related ends, the invention, then, consists of a calibrator mechanism acting in conjunction with a metering unit as hereinafter fully described and particularly pointed out in the claims, taken in connection with the accompanying drawings which form part of the instant specification, and which are to be read in conjunction therewith. It should be understood, however, that there is no intention to limit the invention to the specific forms disclosed, but on the contrary, the intention is to cover all modifications, alternative constructions and equivalents falling within the spirit and scope of the invention as expressed in the appended claims.

In the annexed drawings:

FIGURE 1 is a front elevational view of a calibrator mechanism embodying the present invention and a metering unit being calibrated.

FIGURE 2 is a top plan view of the calibrator mechanism shown in FIGURE 1.

FIGURE 3 is an end elevational view of the calibrator mechanism shown in FIGURE 1.

FIGURE 4 is a partial section view of a metering unit taken along line IV—IV of FIGURE 5.

FIGURE 5 is a front elevational view of the calibrator mechanism shown in FIGURE 1 calibrating a different style metering unit and having an alternate trigger finger.

FIGURE 6 is a diagrammatic representation of a circuit arrangement incorporated in the calibrator mechanism of FIGURE 1.

The invention as disclosed in the present application shows a metering unit, such as a parking meter timer assembly, actuating a calibrator mechanism. The metering unit will be set into operation in the normal manner, for example, by inserting a coin into the metering unit which registers a specific period of time on the meter's indication face. The calibrator mechanism will be started by either the metering unit acting on it or the repair or serviceman turning it on. When the metering unit's time period terminates, it will either cease to act on the calibrator mechanism or will act on the calibrator mechanism, automatically stopping the calibrator counter. The calibrator counter provides a reading of the time period which may be recorded at any time by the person or persons servicing or repairing the metering unit.

Generally referring to FIGURES 1, 2 and 3, we have a calibrator mechanism 10 having a calibrator unit 11 and a switch unit, hereinafter referred to as a microswitch unit 30, which are secured together by a connecting conduit 13. The calibrator unit 11 has a cover 15 and receives electrical current from a power supply 89. On the top of the cover 15 we have a face plate 17 which holds a calibrator counter 18 and a counter dial 19. The calibrator counter 18 is used to record a time period, for example, it could record minutes into tenths or hundreths. After the time period has been noted or recorded, the counter dial 19 is used to zero the calibrator counter 18 preparing it for the next calibration. The use of the calibrator unit 11 and counter 18 will be explained in more detail below. An indicator light 21 and a counter position switch 22 are mounted on the front of cover 15. The indicator light 21 indicates when the calibrator counter 18 has completed its operation and has a reading of the time period. The counter position switch 22 is connected to and functions with the microswitch 30 as will be explained in more detail below.

The microswitch 30 has a housing 31, a base plate 38 secured to the housing, and a switch 41 and switch body 24 mounted in the housing. The microswitch 30 is actuated by a trigger finger 34 which acts with the switch 41, as seen in FIGURE 3. The switch 41 is spring loaded and when the microswitch unit 30 is in a free state it holds the trigger finger 34 in an up position, shown in phantom in FIGURE 1. The trigger finger 34 is supported by a finger securing shaft 37 which passes through support ears 32 which are extensions of the switch body 24. The up position of the trigger finger 34 is controlled by a finger adjustment screw 36.

The calibrator mechanism 10 is supported by a workbench 14 and contacts the workbench with acorn nuts 26 and 27. Acorn nuts 26 are secured to base plate 38 by screws 28 and acorn nuts 27 are secured to the bottom of calibrator unit 11. Buzzer attachment terminals 23, 25 are mounted to the back of cover 15. These attachment terminals permit audible or other signal devices to be connected with the calibrator unit 11 and will operate with the indicator light 21 as will be explained in more detail below.

Referring to FIGURE 1, we have a metering unit 50, which is a commercially used and available coin operated parking meter, having a body assembly 51 which supports a timer indication face 52 with a timer arm 56. The body assembly 51 also supports a swingable termination flag 54 which initiates the time period by acting on the trigger finger 34, causing the calibrator counter 18 to operate. When the timer arm 56 arrives at zero, the termination flag 54 terminates the time period and stops calibrator counter 18 by swinging to its up position, indicated in phantom in FIGURE 1. The term "expired" is visible when termination flag 54 is in the up position showing that any vehicle parked in the space the metering unit 50 controls is parking illegally.

To initiate the metering unit's timer, a coin would be placed in coin slots 58, for example, a penny or nickel in 58a, or a dime in 58b. Then a timer actuator dial 61 is rotated about its center causing the timer arm 56 to designate the amount of time purchased on the timer indication face 52. This causes the termination flag 54 to swing to its lower position and act on trigger finger 34, as viewed in FIGURE 1. In normal operation, the coin would be discharged through coin discharge chute 62 into a collection box (not shown). However, in the repair shop the coin would merely drop out on workbench 14 permitting the person repairing or servicing the meter to reclaim it.

Referring generally to FIGURES 4 and 5, we have a calibrator mechanism 10, the same as discussed in reference to FIGURES 1, 2 and 3, however, it has a bifurcated trigger finger 35 which will be discussed in more detail below.

A metering unit 70 is shown in FIGURE 5 and has a body assembly 71 which has a front plate 72 and a main housing 73. A timer indication face 76 is swingable about axis 79, and has a termination flag 74 mounted at its upper central area. A flange 77 extends along the bottom of the timer indication face 76 and terminates generally below the zero designation on face 76. A timer arm 78 rotates about pivot 65 and is connected to a timer device (not shown) by timer arm linkage members 75. The metering units timer device is set into operation by inserting a coin in a coin slot provided in the top part of front plate 72 (not shown). This causes the timer arm linkage members 75 to rotate the timer arm 78 about pivot 65 to the purchased amount of time as designated by its position on the timer indication face 76. Lug 68 of the timer arm 78 supports the timer indication face 76 by acting on its flange 77. When the timer device moves the timer arm 78 to zero, the lug 68 will no longer contact the flange 77, and the timer indication face 76 will drop to its down position, as indicated in phantom in FIGURE 5, placing the termination flag 74 in view and indicating a violation if a vehicle is in the space the metering unit 70 controls.

The metering unit 70 has a lever 42 with a meter start arm 43 and a meter termination arm 44 supported between the front plate 72 and the main housing 73. The lever 42 is swingably secured to a meter lever shaft 45. The shaft 45 is secured to the main housing 73 by a bolt 46. The front plate 72 is secured to and spaced from the main housing 73 by several spacer members, one spacer member 47 is shown in FIGURE 4.

In normal use, when a coin puts the metering unit 70 into operation, the time indication face 76 rotates about axis 79 to its up position. During this movement the flange 77 contacts the meter start arm 43 and swings lever 42 upright as viewed in FIGURE 5. This starts the metering unit's timer device. When the timer arm 78 reaches zero, the face 76 drops to its lower position contacting meter termination arm 44 and swings lever 42 to a down position. This stops the metering unit's timer device. During calibrating the bifurcated trigger finger 35 is placed around start arm 43, as viewed in FIGURE 4, and causes the flange 77 to act on it in place of meter termination arm 44 when the meter period is ended. In this embodiment, when the trigger finger 35 is in the up position, the calibrator counter 18 is in operation. The calibrator counter 18 will be started by the person servicing or repairing the metering unit when he starts the metering unit's time period running. When trigger finger 35 is moved to its down position, as illustrated in phantom in FIGURE 5, the calibrator counter 18 is stopped and has a time period reading.

In the embodiment shown in FIGURE 5, an adjustment block 16 is shown supporting the metering unit 70 so that the proper relationship between the trigger finger 35 and the actuation means, timer indication face 76 in this case, are established. Various means could be employed to adjust the relationship between the metering unit and the calibrator mechanism 70. It is evident, also, that various forms of trigger fingers could be used depending upon the type or style of metering unit which is to be calibrated. The trigger fingers are easily replaced by removing releasably held finger securing shaft 37 and putting the desired trigger finger in place.

Referring generally to FIGURES 1 and 6, a typical electrical circuitry system to be used with our invention will be discussed. Power supply 80 is controlled by on-off switch 48. Power supply 80 has a power line 81 and a ground line 82. Power line 81 and ground line 82 are connected to connections 83 and 84, respectively. When the calibrator counter 18 is operating, as illustrated in FIGURE 1, the counter position switch 22 is in position A which would have arms 91 and 92 in contact with connections 103 and 97, respectively. The switch 41 illustrated by a dotted line 41a, in FIGURE 6, would have an arm 87 of microswitch 30 in the down position contacting connection 115. This permits electrical current to flow from the connection 83 through a line 85 to a connection 86. Then the current flows through the arm 87 into connection 115 and through a line 114 to a connection 98. Because counter position switch 22 is in position A, the current will flow through arm 92 to the connection 97 and then through a line 96 to a connection 95. Then it will move through a line 111 to the calibrator unit 11. The current will flow through the calibrator unit and then through a line 112 to a connection 110, on through a line 113 to the connection 84 and to the ground line 82.

While the calibrator mechanism 10 is in the above described condition the calibrator counter will be reading the time period occurring. When the termination flag 54 swings up, it permits the trigger finger 34 to be moved to its upper position by switch 41. This causes the current to flow from the connection 83 through the line 85 into connection 86 and arm 87. Arm 87 will move to its up position when switch 41 moves trigger finger 34 up and is placed in contact with a connection 88 sending the current through a line 89 to a connection 90 and on through the arm 91 and connection 103 and along a line 102 to the connection 101 which sends the current through a line 104 into a connection 105. The current then moves along a line 106 through the indicator light 21 out through a line 107 to connection 108, on through a line 109 to the connection 110 and out to connection 84 through line 113. At this time the calibrator counter 18 is stopped and has the reading of the metering unit's time period. The person repairing or servicing the metering unit 50 may record this as part of the repair or service record and use counter dial 19 to put the calibrator counter 18 back to zero.

In review, when the counter position switch 22 is in position A and the trigger finger 34 is in the down position, the calibrator counter 18 will be operating. When the trigger finger 34 is moved to its up position by switch 41, the calibrator counter 18 stops with the timed period reading and the indicator light 21 is turned on so the repair or service person will know that he can get the time period reading from the calibrator counter 18. If for some reason an audible or other electrical indicator unit is needed, it can be connected to buzzer attachment terminals 23, 25 in parallel with the indicator light 21.

Referring generally to FIGURES 5 and 6, the counter position switch 22 is in position B with the arms 91 and 92 contacting connections 93 and 99, respectively. When the calibrator counter 18 is operating, the switch 41a is in the up position with arm 87 contacting the connection 88. In this position the current from power line 81 passes from connection 83 through line 85 and connection 86 to arm 87. The current then continues through connection 88 and line 89 to connection 90 and then through arm 91 to connection 93. The current then continues through line 94 to connection 95 and through line 111 into the calibrator unit 11 to operate the calibrator counter 18. The current leaves the calibrator unit and passes to ground line 82 through line 112, connection 110, line 113, and connection 84. When the timer arm 78 arrives at zero, the timer indication face 76 rotates to its lower position about axis 79 and the flange 77 contacts the bifurcated trigger finger 35 and moves switch 41a and arm 87 to their down positions. The current then would pass from the power line 81 through connection 83 and line 85 to the connection 86. The current passes through arm 87, continues through connection 115 and moves through line 114 and connection 98. The current passes through arm 92, connection 99 and line 100 to connection 101. The current then passes through line 104 to connection 105 and on through line 106 through indicator light 21 and on through line 107. The current then passes from connection 108 to ground line 82 by passing through line 109, connection 110, line 113, and connection 84. Again, other attachments, as mentioned above could be connected in parallel with indicator light 21 by use of buzzer attachment terminals 23 and 25.

In review, when the counter position switch 22 is in position B and the trigger finger 35 is in the up position, the calibrator counter 18 will be operating. When the trigger finger 35 is moved to its down position it moves switch 41 down, the calibrator counter 18 then stops with the time period reading and the indicator light 21 is turned on so the repair or service person will know that he can get the time period reading from the calibrator counter. Again, if an audible or other electrical indicator unit is needed it can be connected to the buzzer attachment terminals 23 and 25.

The power supply 80 could be either AC or DC current. The usual application, however, would be to plug the calibrator mechanism into commercially available 120 volt, 60 cycle AC current. It should be pointed out, also, that counter position switch 18 could have a third position, off, which would eliminate the need for on-off switch 48.

It will be seen from the above and the appended claims that simple and inexpensive yet practical and durable means have been disclosed for attaining the desired ends. Attention is again invited, however, to the possibility of making variations within the spirit and scope of the invention set forth. Also directional and positional terms such as "up," "down," "first," and "second" have been used to facilitate explaining and claiming the invention in the positions shown and described in the drawings and specification and are not to be considered as limiting the invention.

Other modes of applying the principles of our invention may be employed, instead of those explained, change being made as regards the calibrator mechanism and unit therefore which has been disclosed, provided the means stated by any of the following claims or the equivalent of such stated means be employed.

We therefore particularly point out and distinctly claim as our invention:

1. A metering unit calibrator mechanism for use in calibrating the time period of a metering unit, said calibrator mechanism comprising:
   (a) a calibrator unit having a time recording means,
   (b) a first switch connected to said time recording means and having a first position and a second position,
   (c) a first switch actuation means which is actuated by the termination of said metering unit's time period,
   (d) a counter position switch having first and second positions and being connected with and controlling said first switch,
   (e) said first switch starting said time recording means when in its first position and stopping said time recording means when in its second position when said counter position switch is in its first position, and
   (f) said first switch starting said time recording means when in its second position and stopping said time recording means when in its first position when said counter position switch is in its second position.

2. A metering unit calibrator mechanism for use in calibrating the time period of a metering unit, said calibrator mechanism comprising:
   (a) a calibrator unit with a calibrator time counter,
   (b) a first switch connected to said calibrator unit by a connecting conduit,
   (c) a trigger finger as part of said first switch and being acted upon during part of the calibrating cycle by the metering unit,
   (d) said trigger finger acting upon said first switch to start and stop said calibrator time counter,
   (e) a counter position switch having a first and second position,
   (f) said trigger finger having an up and down position,
   (g) said counter position switch connecting said first switch and said calibrator time counter,
   (h) said counter position switch starting said calibrator time counter when said trigger finger is in its up position and stopping said calibrator time counter when said trigger finger is in its down position when the counter position switch is in its first position, and
   (i) said counter position switch starting said calibrator time counter when said trigger finger is in its down position and stopping said calibrator time counter when said trigger finger is in its up position when the counter position switch is in its second position.

3. A calibrator mechanism as specified in claim 2, having,
   (a) buzzer attachment terminals connected with said first switch and said counter position switch, and
   (b) said terminals to be electrically charged when said calibrator time counter is stopped.

4. A calibrator mechanism as specified in claim 1, having,
   (a) an indicator light connected with said first switch and said counter position switch, and (b) said indicator light will light when said time recording means is stopped.

5. A calibrator mechanism as specified in claim 2, having,
   (a) an indicator light connected with said first switch and said counter position switch, and
   (b) said indicator light lighting when said calibrator time counter is stopped.

6. A calibrator mechanism as specified in claim 5, having,
   (a) attachment terminals connected with said indicator light.

7. A calibrator mechanism as specified in claim 6, having,
   (a) a counter dial as part of said calibrator counter and used to zero said calibrator counter.

8. A metering unit calibrator mechanism for use in calibrating the time period of a metering unit and having an electrical time counter to register the period, said calibrator mechanism comprising,
   (a) a microswitch electrically connected to said time counter,
   (b) a trigger finger pivotally mounted to said microswitch and having up and down positions,
   (c) said metering unit having a time device operating a timer arm which indicates said time period on a timer indication face,
   (d) a termination flag as part of said metering unit and contacting and putting said trigger finger in its down position causing said time counter to start,
   (e) means to move said termination flag from contact with said trigger finger when said time period terminates,
   (f) means to move said trigger finger to said up position when said termination flag no longer contacts said trigger finger, and
   (g) said time counter stops when said trigger finger moves to its up position.

9. A calibrator mechanism as specified in claim 8, having,
   (a) a finger securing shaft to mount said trigger finger to said microswitch, and
   (b) said finger securing shaft being releasably held to said microswitch by said trigger finger.

10. A metering unit calibrator mechanism for use in calibrating the time period of a metering unit and having an electrical time counter to register the period, said calibrator mechanism comprising,
    (a) microswitch electrically connected to said time counter,
    (b) a trigger finger pivotally mounted to said microswitch and having up and down positions,
    (c) said metering unit having a time device operating a timer arm which indicates said time period on a timer indication face,
    (d) said timer indication face movably mounted on said metering unit and having operation and termination positions,
    (e) means to move said timer indication face from said operation position to said termination position when said time period terminates,
    (f) said timer indication face when moving to said termination position contacting and moving said trigger finger to said down position, and
    (g) said time counter stops when said trigger finger moves to said down position.

11. A calibrator mechanism as specified in claim 10, having,
    (a) a finger securing shaft to mount said trigger finger to said microswitch, and
    (b) said finger securing shaft being releasably held to said microswitch by said trigger finger.

References Cited

UNITED STATES PATENTS

| 2,056,690 | 10/1936 | Slye | 58—145 |
| 2,971,367 | 2/1961 | Shindledecker | 73—5 |

DAVID SCHONBERG, Primary Examiner.

LOUIS R. PRINCE, Examiner.

S. C. SWISHER, Assistant Examiner.